UNITED STATES PATENT OFFICE.

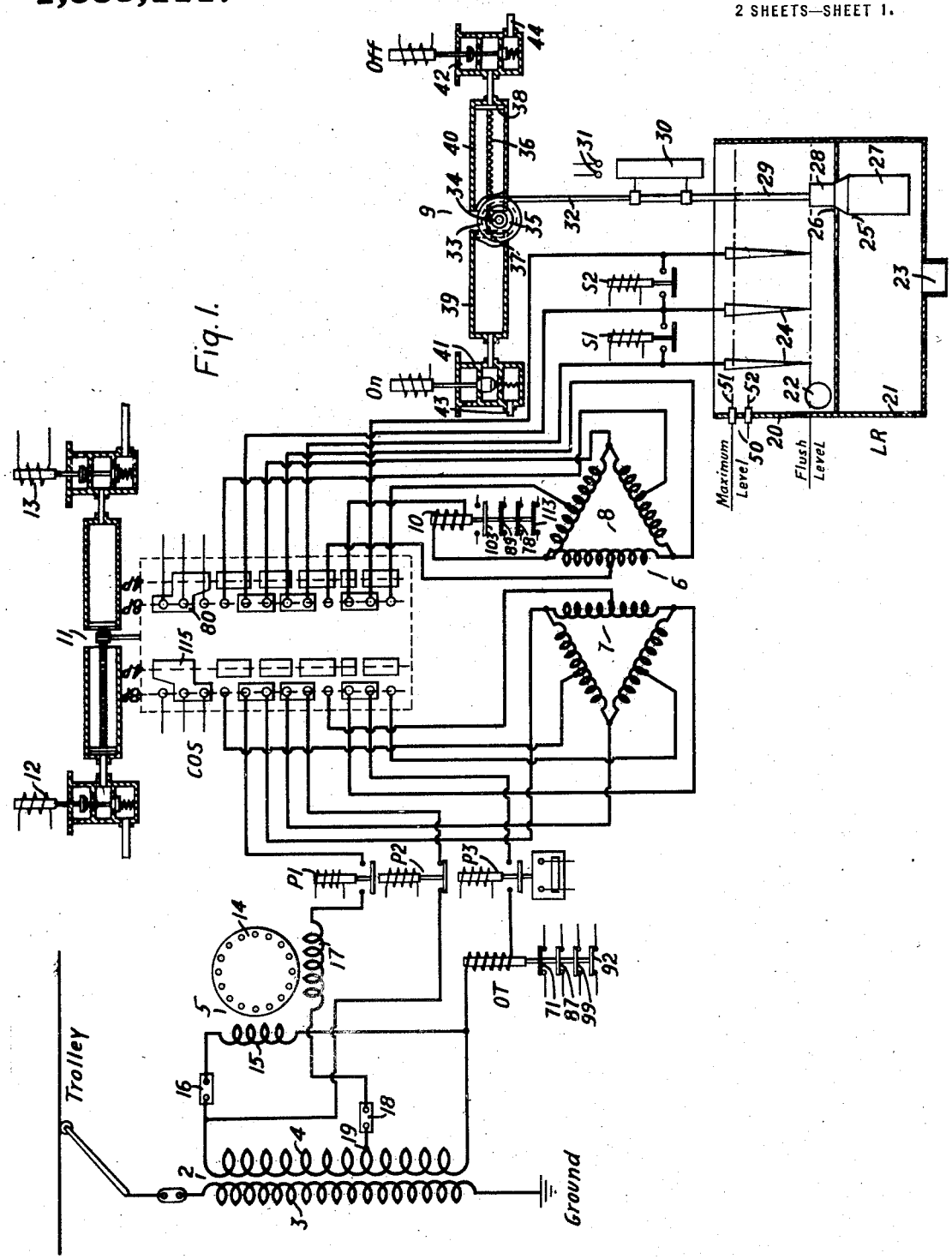

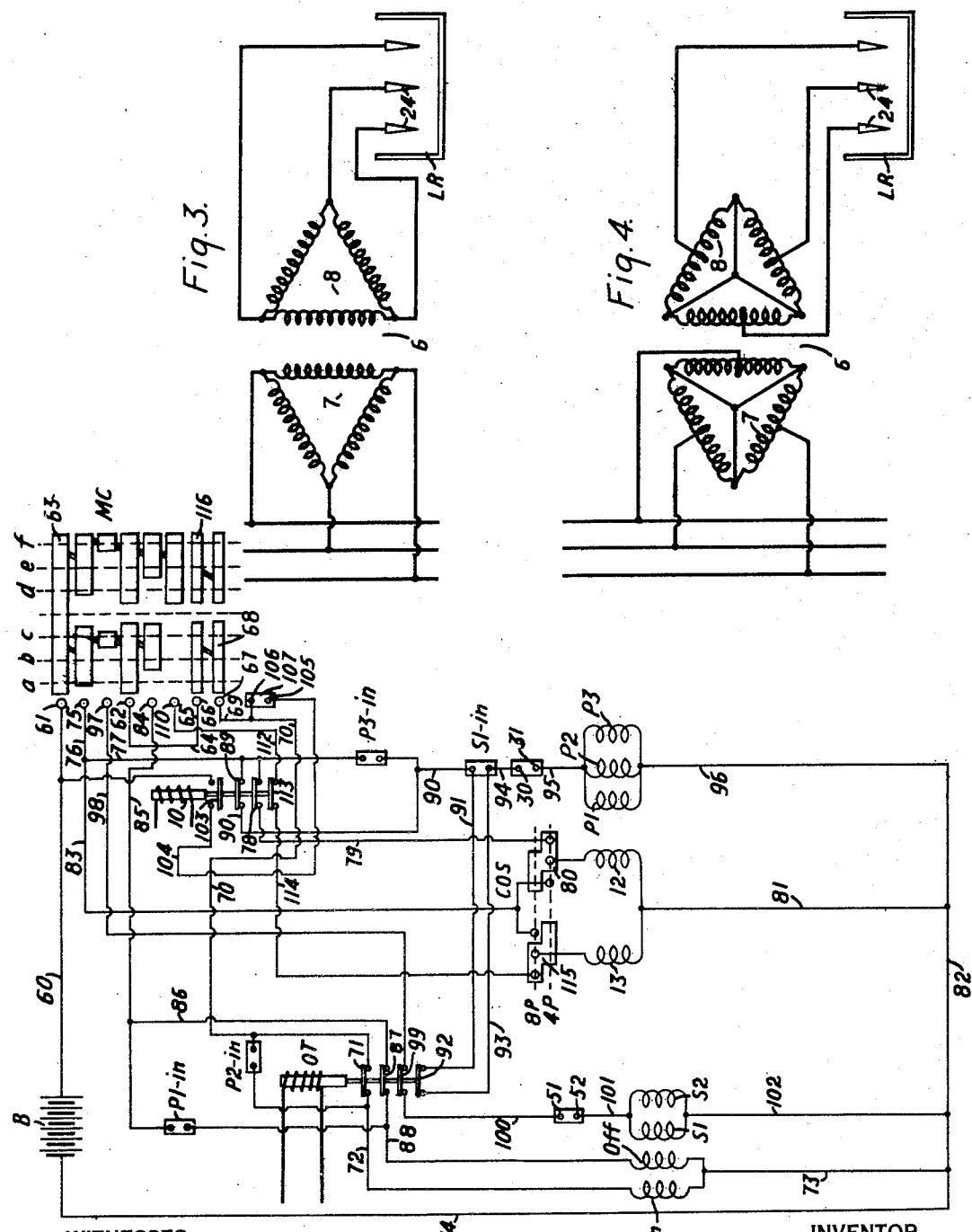

RUDOLF E. HELLMUND, OF SWISSVALE, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,335,111.   Specification of Letters Patent.   Patented Mar. 30, 1920.

Application filed February 3, 1917. Serial No. 146,462.

*To all whom it may concern:*

Be it known that I, RUDOLF E. HELLMUND, a subject of the Emperor of Germany, and a resident of Swissvale, in the county of Allegheny and State of Pennsylvania, have invented a new and useful Improvement in Systems of Control, of which the following is a specification.

My invention relates to systems of control and it has special relation to the automatic control of induction-motor circuits under predetermined electrical conditions in the machine.

The object of my invention is to provide simple and effective means for preventing the occurrence of relatively high transient voltage or current surges in induction motors and the like when supply-circuit voltage is resumed after a temporary interruption thereof, such as may be caused by the passage of the vehicle trolley underneath a section-breaker or the occurrence of overload-current conditions.

More specifically stated, the object of my invention is to so interlock the various primary and secondary circuits of an induction motor, which is preferably governed by a secondary resistance of the liquid rheostat type, that the desired sequence of operation relative to the closing and opening of the various circuits shall be properly effected under all conditions.

My invention may best be understood by reference to the accompanying drawings, wherein Figure 1 is a diagrammatic view of the main circuits of a system of control embodying my invention; Fig. 2 is a diagrammatic view of a set of auxiliary circuits for governing the main connections shown in Fig. 1; and Fig. 3 and Fig. 4 are simplified diagrammatic views respectively illustrating the motor-winding connections under different operating conditions.

Referring to Fig. 1, the system shown comprises suitable single-phase supply-circuit conductors respectively marked "Trolley" and "Ground"; a supply-circuit transformer 2 having a primary winding 3 directly connected to the supply-circuit conductors and having a secondary low-voltage winding 4 that is adapted to supply energy through a rotary phase-converter 5 to a three-phase induction motor 6 that is provided with a primary winding 7 and a secondary winding 8; a secondary-circuit resistor, here shown as comprising a liquid rheostat LR, which is provided with an operating mechanism 9; a change-over switch COS for changing the number of operating magnetic poles of the motor to provide a plurality of speed ranges; and a plurality of relay devices 10 and OT respectively connected in the circuits of the secondary motor-winding 8 and the primary motor-winding 7 for the purpose of governing certain auxiliary-circuit connections to be described.

The phase converter 5 may be of any suitable type and is illustrated as comprising a rotor 14 of the well-known squirrel-cage type; a primary or inducing stator winding 15, which is connected across the secondary transformer 4 through the agency of a switch 16; a secondary or induced winding 17, which is connected through a suitable switch 18 between an intermediate point 19 of the secondary transformer winding 4 and one of the terminals of the primary motor winding 7.

A plurality of suitable switches P1, P2 and P3 of a familiar electrically controlled type are employed for connecting the primary motor winding 7 to the phase converter 5 and the secondary transformer winding 4, in accordance with familiar principles, whereby a balanced three-phase voltage may be applied to the primary motor-winding terminals. The secondary motor winding 8 is connected, in the usual manner, to the liquid rheostat LR, and a plurality of the customary short-circuiting switches S1 and S2 are provided for short-circuiting the secondary-winding terminals under relatively high-speed motor conditions, as set forth in detail later.

For a more complete description of the phase-converter circuits, which pertain only indirectly to my present invention, reference may be had to a co-pending application of Benjamin G. Lamme, Serial No. 808,714, filed Dec. 26, 1913, patented Oct. 16, 1917, No. 1,243,430, and assigned to the Westinghouse Electric and Manufacturing Company.

The relay device 10 is shown as energized in accordance with the secondary motor-winding current and is adapted to occupy its upper position whenever the corresponding current has a value above a predetermined relatively low limit, or, in other words, the relay device 10 drops to its lower or illustrated position only when the secondary motor current reaches a relatively weak value.

The other relay device OT corresponds to the familiar overload trip or circuit-breaker and is adapted to lift from its illustrated operative position whenever the primary motor current exceeds a predetermined safe value.

The change-over switch COS is preferably of a familiar drum type but is here shown as developed into a single plane for purposes of clearness. The change-over switch is adapted to occupy either of two positions, respectively marked 8P and 4P, standing for 8-pole connection and 4-pole connection, of the induction-motor windings 7 and 8. Normally, the switch occupies the illustrated position 8P, which corresponds to the lower-speed connections of the induction motor. The change-over switch is provided with a suitable actuating mechanism 11, preferably comprising a plurality of alternately energized coils 12 and 13 for actuating the switch to the desired position. In addition to the main-circuit contact members carried by the switch, a plurality of auxiliary contact members, for purposes to be set forth in connection with Fig. 2, may also be provided.

The liquid rheostat LR may be of any suitable form and is shown as embodying a containing tank 20, a bottom reservoir 21, an inlet opening 22 for admitting liquid to the tank 20 and a discharge opening 23 from the reservoir 21, circulation being continuously maintained by means of a suitable pumping system (not shown); a plurality of electrodes 24 for the different secondary-circuit phases; and a combined discharge and regulating valve 25 that operates in connection with a bottom tank opening 26 for varying the liquid level in the tank and thus determining the value of secondary motor-circuit resistance.

The valve 25 is shown as comprising a lower hollow cylindrical portion 27 of a diameter substantially equal to that of the bottom tank opening 26 and a contiguous upper hollow cylindrical portion 28 of materially smaller diameter. Under the illustrated normal conditions, therefore, the continuously circulated electrolyte is discharged from the tank 20 around the valve 25 into the reservoir 21, but when the valve portion 27 is raised to any position wherein the tank opening 26 is substantially filled, then the level of the electrolyte is raised to a height corresponding to the top of the upper valve portion 28 and the liquid is discharged down through the valve to the reservoir. The liquid level may thus be varied as desired by merely fixing the position of the valve 25.

An operating rod or stem 29 for the valve 25 is provided with a suitably insulated electrical contact member 30 which is adapted to bridge a pair of stationary contact members 31 when the liquid level occupies any position between the initial closure of the secondary motor circuits, marked "Flush level" and the final liquid height marked "Maximum level", for a purpose to be set forth in connection with Fig. 2.

To vary the position of the valve 25, a rope or cable 32 is secured to the rod 29 and passes over a sheave or pulley 33 that is rigidly mounted upon a shaft 34.

The operating mechanism 9 is of a familiar type and comprises a pinion 35 which is secured to the operating shaft 34 and is adapted to suitably mesh with a horizontally movable rack member 36, the opposite ends of which constitute pistons 37 and 38 which travel within appropriate operating cylinders 40 and 39. A plurality of dissimilar valve members 41 and 42 are associated with the respective operating cylinders to admit fluid pressure thereto through a plurality of suitable pipes or passages 44 and 43 from any suitable source (not shown), under predetermined conditions. Actuating coils marked "On" and "Off" are provided for the respective valve members 41 and 42. The valve member 42 is normally open to admit fluid pressure to the corresponding cylinder 40, whereby the operating mechanism is biased to the illustrated position since the other valve member 41 is normally closed to prevent the access of fluid pressure to the cylinder 39 and to connect that cylinder with the atmosphere.

The operation of the mechanism just described, without regard to the electrical connections effected thereby, may be described as follows: To produce a movement of the pistons toward the left and, therefore, an upward movement of the valve 25, the actuating coils "On" and "Off" are concurrently energized, whereby the normal unbalanced fluid-pressure conditions are reversed, that is to say, fluid pressure is admitted to the cylinder 39 and is exhausted from the other cylinder 40. Consequently, the desired movement ensues and such movement may be arrested at any time by merely deënergizing the "off" coil to thereby produce balanced fluid-pressure conditions in the two operating cylinders. To return the mechanism toward the illustrated position, the actuating coils "On" and "Off" are concurrently deënergized, whereupon fluid-pressure conditions revert to the original state and the desired movement is effected.

An electrolytic interlock 50 is provided in connection with the closure of the short-circuiting switches S1 and S2 and is shown as comprising a plurality of plates or conductors 51 and 52 which insulatedly extend through a wall of the tank 20 and are suitably connected to the proper external circuit, as described in connection with Fig. 2. The upper plate 51 is positioned in the plane marked "Maximum level" and, consequently, the circuit governed by the electrolytic interlock is closed when maximum fluid-level conditions are attained.

Reference may now be had to Fig. 2, wherein the system shown comprises the various actuating coils of the switches and of the operating mechanism 9, a plurality of electrical interlocks of a familiar type that are actuated by the respectively designated switches in accordance with the familiar construction that is illustrated in Fig. 1, in connection with the switch P3 only; the auxiliary contact members of the relay devices 10 and OT; a master controller MC that is adapted to occupy a plurality of operative positions $a$ to $f$, inclusive; and a source of energy, such as a battery B, for energizing the various actuating coils, in accordance with the position of the master controller MC and the various interlocking contact members.

Assuming the change-over switch COS to occupy its position 4P and the other initial circuit connections to be as illustrated, the operation of the system may be set forth as follows: Upon actuation of the master controller MC toward its first operative position $a$, a circuit is initially completed from the positive terminal of the battery B through conductor 60, control fingers 61 and 62 which are bridged by contact segment 63 of the master controller, conductors 64 and 65, control fingers 66 and 67, which are bridged by contact segment 68 of the master controller, conductors 69 and 70, coöperating stationary contact members 71 of the relay device OT, conductor 72, the actuating coil "On" of the liquid rheostat operating mechanism 9, and conductors 73 and 74 to the negative battery terminal.

A circuit is next completed from the contact segment 63 through control finger 75, conductors 76 and 77, coöperating contact members 78 of the low-current relay device 10, conductor 79, contact member 80 of the change-over switch COS, provided that switch occupies its position 4P, actuating coil 12 of the switch and conductors 81 and 82 to the negative battery 74. The change-over switch will thus be actuated to the illustrated position 8P and will subsequently be maintained in that position, irrespective of the movement of the relay device 10, by reason of the closure of a circuit from the positively energized conductor 76 through conductor 83, contact member 80 of the change-over switch in its position 8P, and thence through the actuating coil 12, as already traced.

Upon movement of the master controller MC to its second operative position $b$, a circuit is established from the contact segment 63 through control finger 84, conductors 85 and 86, coöperating contact members 87 of the overload relay device OT in its lower position, conductor 88 and the actuating coil "Off" of the operating mechanism 9 to the negatively energized conductor 73.

Since the actuating coils "On" and "Off" are thus concurrently energized, upward movement of the combined discharge and regulating valve 25 occurs, and the stationary contact members 31 are bridged by the movable contact member 30 as soon as "flush level" conditions obtain. Consequently, a new circuit is completed from the positively energized conductor 77 through coöperating contact members 89 of the relay device 10 in its lower position, conductors 90 and 91, coöperating contact members 92 of the overload relay device OT in its lower position, conductors 93 and 94, contact members 30 and 31 of the liquid rheostat LR, conductor 95, the parallel-related actuating coils of the primary switches P1, P2 and P3, and conductor 96 to the negatively-connected conductor 82.

As soon as the switch P3 is closed, an interlock P3—in bridges the coöperating contact members 89 of the relay device 10, and thus the primary switches are maintained in their closed position, irrespective of the subsequent actuation of the relay device 10 to its upper position as soon as a predetermined value of secondary motor-winding current traverses the rheostat. Further auxiliary circuits completed by the closure of the switches P1 and P2 are as follows: The bridging of the coöperating contact members 87 of the relay device OT by an interlock P1—in and the corresponding short-circuit of the coöperating contact members 71 of the relay device by an interlock P2—in. In this way, the operation of the actuating coils "On" and "Off" is rendered partially independent of the movement of the relay device OT, for a purpose to be subsequently explained.

The progressive upward movement of the liquid rheostat valve 25 may be arrested at any time by merely moving the master controller backwardly to its position $a$ to thereby deënergize the actuating coil "Off" and thus cause balanced fluid-pressure conditions to obtain in the operating cylinders 39 and 40, in accordance with the previously-discussed principles.

After the electrolyte has been raised to the plane marked "Maximum level," the master controller MC may be actuated to its position $c$, whereupon a new circuit is completed from the contact segment 63 through control finger 97, conductor 98, coöperating contact members 99 of the overload tripping contact members 99 of the overload trip device in its lower position, conductor 100, stationary contact members 51 and 52 of the electrolytic interlock 50, which are now connected by the electrolyte, conductor 101, the parallel-related actuating coils of the switches S1 and S2 and conductor 102 to the negative conductor 82.

By reference to the main-circuit connections of Fig. 1, it will be observed that the primary and secondary motor windings 7 and 8, respectively, are connected in delta relation, the respective winding terminals being connected to the three-phase supply-circuit conductors and to the liquid rheostat electrodes, as illustrated in a simple manner in Fig. 3. Since the 8-pole connection shown is old and well-known in the art, no further description or explanation thereof is deemed necessary.

In order to change the motor connections to the 4-pole arrangement, the primary and secondary motor-winding-circuit connections should first be opened and then the change-over switch should be thrown over, so that no currents are made or broken upon the contact members of the change-over switch. The change of connections is effected in the following sequence: Upon moving the master controller MC through a transition position toward the operative position $d$, the contact segment 63 first becomes disengaged from the control finger 97, whereby the energizing circuit for the actuating coils of the switches S1 and S2 is interrupted and these switches are opened.

The primary switches P1, P2 and P3 are next opened, by reason of the peculiar configuration of the contact segment 63, which becomes disengaged from the control finger 75 after the control finger 97, and, finally, the control fingers 62 and 84 become disengaged from the contact segment 63, while the control fingers 66 and 67 simultaneously interrupt their contact with the segment 68, whereby the actuating coils " On " and " Off " are concurrently deënergized to cause the above-described return movement of the operating mechanism 9. Thus, the short-circuiting switches for the secondary motor winding are first opened, the primary motor-winding switches are opened next in order, and, finally, the electrolyte is discharged from the containing tank 20 to interrupt the secondary motor-winding circuit as soon as " Flush level " is passed.

However, the electrolyte will be momentarily held at " Flush level " by reason of the fact that the relay device 10 will remain in its upper position for a short time until the secondary motor-winding current has decreased to a relatively low value, the coöperating contact members 103 of the relay device 10 being closed in the upper position thereof to directly connect the positive conductor 60 through the contact members 103, conductor 104, control fingers 105 and 106 which are bridged by the contact segment 107 in the "off" position of the master controller, to the conductor 70, thereby temporarily maintaining the energization of the " on " coil. As soon as the relay device 10 drops to its lower position, the circuit of the " on " actuating coil is interrupted and the electrolyte is entirely discharged from the containing tank 20, the valve 25 dropping to the illustrated position.

As a master controller is moved toward its position $d$, the contact segment 63 engages a control finger 110, whence a circuit is established through conductor 112, coöperating contact members 113 of the relay device 10, provided the device occupies its lower position, conductor 114, contact member 115 of the change-over switch COS in its position 8P, the actuating coil 13 of the switch and conductor 81 to the negative conductor 82.

The change-over switch is thus actuated to its position 4P without interrupting any current-carrying circuits by its contact members. A holding circuit is thereupon formed from the positively energized conductor 83 through contact segment 115 of the change-over switch in its position 4P and thence through the actuating coil 13.

In positions $d$ and $e$ of the master controller, the control fingers 62 and 84 also again engage the contact segment 63, and a contact segment 116 bridges the control fingers 66 and 67, whereby the actuating coils " On " and " Off " are concurrently energized, in the previously described manner, to cause the liquid rheostat valve 25 to be gradually moved upwardly and, as also set forth above, the primary switches P1, P2 and P3 are closed as soon as the liquid rheostat contact members 30 and 31 become engaged.

In position $f$ of the master controller, the contact segment 63 reëngages the control finger 97, whereby the short-circuiting switches S1 and S2 are again closed, as hereinbefore described, as soon as the contact members of the electrolytic interlock 50 are connected by the electrolyte.

The arrangement of primary and secondary motor windings after the change-over switch COS has been moved to its position 4P, is shown in a simplified manner in Fig. 4, wherein the terminals of the primary and the secondary windings are respectively connected together, while the midpoints of the primary windings are connected to the three-phase supply-circuit conductors, and the midpoints of the secondary windings are connected to the liquid rheostat electrodes. Since the 4-pole connections just outlined are familiar to those skilled in the art, no further explanation or discussion thereof is deemed necessary.

Without extended discussion, it will be understood that regenerative operation of the machine 6 may be effected under any suitable speed conditions thereof by manipulating the circuit connections to correspond to a lower speed, whereupon the machine is rotated at a speed above synchronism for the particular circuit connections employed and thus becomes an induction generator. Since the regenerative operation will be readily understood from the foregoing description of the various accelerating steps, no further exposition thereof is believed to be necessary here.

When the master controller is returned toward its illustrated "off" position, the various circuits will be opened in the previously described order, namely, the short-circuiting switches S1 and S2 first, the primary switches P1, P2 and P3 next, and, finally, the electrolyte will be discharged from the containing tank 20.

Under overload conditions, a sequence of opening of the various circuits similar to that previously described occurs, by reason of the peculiar interlocking arrangements that are illustrated. When the overload relay device OT is raised to its upper position, the energizing circuit of the actuating coils of the switches S1 and S2 is first directly interrupted and the switches in question are opened. Thereupon, the primary switches P1, P2 and P3 are also opened, as soon as the interlock S1—in, which bridges contact members 92 of the relay device OT, interrupts the energizing circuit for the corresponding actuating coils. Finally, the dropping out of the switches P1, P2 and P3 interrupts the energizing circuits of the actuating coils "On" and "Off" by reason of the removal of the interlocks P1—in and P2—in therefrom, and the electrolyte is discharged from the containing tank until "Flush level" is reached. Complete opening of the secondary motor circuit is effected only after the relay device 10 drops to its lower position, as hereinbefore set forth.

It will be understood that, in lieu of employing an actuating coil energized in accordance with the secondary motor-winding current, an actuating coil energized in accordance with the primary motor-winding voltage would serve the same purpose.

The previously described interlocking functions may be summarized as follows: After the primary switches P1, P2 and P3 have been opened by overload conditions, or otherwise, the switches cannot again be closed until the relay device 10 has dropped to its lower position, that is, until relatively weak electrical conditions obtain in one or both of the motor windings. Furthermore, the short-circuiting switches for the secondary motor winding are always opened first, thereby introducing a certain value of resistance into the secondary motor circuit; the primary switches are next opened, and, finally, the secondary circuit is gradually interrupted by the discharge of electrolyte, although the final opening of the secondary motor is dependent upon the attainment of the above-described relatively weak conditions in the motor. Moreover, the change-over switch, or any other similar device, cannot be moved until the primary motor voltage or the secondary motor current is substantially zero.

I do not wish to be restricted to the specific circuit connections or arrangement of parts herein set forth, as various modifications thereof may be effected without departing from the spirit and scope of my invention. I desire, therefore, that only such limitations shall be imposed as are indicated in the appended claims.

I claim as my invention:

1. In a control system, the combination with an external source of energy and a dynamo-electric machine having a primary and a secondary winding, of means operated in accordance with machine conditions prevailing independently of said external source and acting upon an opening of the primary circuits for preventing a reclosure thereof until predetermined electrical conditions obtain in one of said windings.

2. In a control system, the combination with a polyphase supply circuit, an induction motor having a primary and a secondary winding, and a plurality of switches for connecting the primary winding to said supply circuit, of means operated by the current flowing through one of said windings and acting upon an opening of said switches to prevent the reclosure thereof until relatively weak electrical conditions obtain in said windings.

3. In a control system, the combination with a polyphase supply circuit, an induction motor having a primary and a secondary winding, and a plurality of switches for connecting the primary winding to said supply circuit, of a relay device operated by the current flowing through the secondary winding for permitting the reclosure of said switches only when a relatively low secondary-winding current obtains.

4. In a control system, the combination with a polyphase supply circuit, an induction motor having a primary and a secondary winding, and a plurality of switches for connecting the primary winding to said supply circuit, of a variable resistance in circuit with said secondary winding, and means acting under predetermined abnormal conditions for preventing the opening of said primary switches until a predetermined value of said resistance is included in circuit.

5. In a control system, the combination with a polyphase supply circuit, an induction motor having a primary and a secondary winding, and a plurality of switches for connecting the primary winding to said supply circuit, of a variable resistance in circuit with said secondary winding, switches for short-circuiting the secondary winding under predetermined conditions, and a relay device acting under predetermined overload-current conditions for preventing the opening of said primary switches until said short-circuiting switches have been opened.

6. In a control system, the combination with a polyphase supply circuit, an induction motor having a primary and a secondary winding, and a plurality of switches for connecting the primary winding to said supply circuit, of a variable resistance in circuit with said secondary winding, and means acting under predetermined abnormal conditions for preventing the opening of said primary switches until a predetermined value of said resistance is included in circuit and for subsequently causing the secondary winding circuit to be broken under relatively high-resistance conditions.

7. In a control system, the combination with a polyphase supply circuit, an induction motor having a primary and a secondary winding, and a plurality of switches for connecting the primary winding to said supply circuit, of a variable resistance in circuit with said secondary winding, switches for short-circuiting the secondary winding under predetermined conditions, a relay device acting under predetermined overload-current conditions for causing the direct opening of said short-circuiting switches, interlocking means associated with said relay device for thereupon causing the opening of said primary switches, other similarly associated interlocking means for thereupon causing the secondary-circuit resistance to materially increase, and means for causing the secondary circuit to open only under predetermined relatively weak electrical conditions in the machine.

8. In a control system, the combination with a supply circuit, a dynamo-electric machine having a primary and a secondary winding, and a plurality of switches for connecting the primary winding to said supply circuit, of means for changing the connections of said machine to adapt it for different ranges of speed, and means for preventing the actuation of said first means after the opening of the primary switches until predetermined electrical conditions obtain in the machine.

9. In a control system, the combination with a supply circuit, an induction motor having a primary and a secondary winding, and a plurality of switches for connecting the primary winding to said supply circuit, of a change-over switch for varying the connections of said motor to adapt it for different ranges of speed, and a relay device for preventing the actuation of said change-over switch after the opening of the primary switches until relatively weak electrical conditions obtain in the machine.

10. In a control system, the combination with an external source of energy and a dynamo-electric machine, of means operated in accordance with machine conditions prevailing independently of said external source and acting upon an opening of a machine circuit for preventing a reclosure thereof until predetermined electrical conditions obtain in a winding of said machine.

11. In a control system, the combination with a polyphase supply circuit, an induction motor having a primary and a secondary winding, and a plurality of switches for connecting the primary winding to said supply circuit, of means operated in accordance with electrical conditions in one of said windings and acting upon an opening of said switches to prevent the reclosure thereof until relatively weak electrical conditions obtain in said windings.

In testimony whereof, I have hereunto subscribed my name this 31st day of January, 1917.

RUDOLF E. HELLMUND.